MAGNETORESISTIVE ASSOCIATIVE MEMORY

Filed Oct. 5, 1965 2 Sheets-Sheet 1

INVENTOR.
JACK I. RAFFEL

BY Martin M. Santa

ATTY.

INVENTOR.
JACK I. RAFFEL
BY Martin M. Santa
ATTY.

United States Patent Office 3,493,943
Patented Feb. 3, 1970

3,493,943
MAGNETORESISTIVE ASSOCIATIVE MEMORY

Jack I. Raffel, Groton, Mass., assignor to Massachusetts Institute of Technology, Cambridge, Mass., a corporation of Massachusetts Filed Oct. 5, 1965, Ser. No. 493,005
Int. Cl. G11b 5/62
U.S. Cl. 340—174 17 Claims

ABSTRACT OF THE DISCLOSURE

Apparatus for non-destructive read-out of the bit information stored in a thin magnetic film having a preferred axis of magnetization and a magnetoresistive effect is disclosed. A magnetic field applied parallel to the stored field direction in the film along the easy axis causes the resistance of the film to change. The field is not strong enough to irreversibly change the flux direction in the stored field when repeatedly applied. While the field is applied, the resistance of the film is increased or decreased dependent upon whether the applied field is in the same direction as the stored field or opposite thereof. A relatively large change in resistance is produced when the fields are opposite in direction. Many serially connected films, each forming a bit storage in a word, may be simultaneously energized. The resistance change in a word whose bit storage field is opposite in at least one bit with the applied energization has a resistance change significantly different from the resistance change of a word where the stored bit and applied bit fields coincide in direction in all the bits of the word. This characteristic of the serially connected storage elements of a word allow each word to be simultaneously energized as in an associative memory to determine which word if any has stored therein the same word information as is contained in the energizing bits.

This invention relates to an associative memory and more in particular too an associative memory which uses magnetoresistive properties of a thin magnetic film for word storage detection.

Desirable properties of the storage elements for an associative or "content-addressed" memory include, besides low cost and high speed, non-destructive read-out, high ratio of mismatch-to-match output when the memory is interrogated, and mismatch output polarity independent of stored information. Most magnetic storage elements when non-destructively read produce "one" and "zero" output signals of opposite polarity. The usual technique for adapting such storage devices to associative memories is to use the storage elements in pairs to provide a unipolar signal for a mismatch condition and a null signal for matched conditions. In addition to increasing the cost because of the extra element per bit of information stored, these techniques usually depend upon cancelling outputs from many pairs of elements which makes it necessary to exercise very strict control of the uniformity of the output signal of each storage element.

It is therefore an object of this invention to provide a binary storage elements which has the desirable properties of the ideal storage element for an associative memory to a considerable degree. Namely, the element has non-destructive read-out, has high mismatch-to-match output signal and provides a unipolar output signal on mismatch regardless of whether a "one" or a "zero" was stored in the element, and in addition is low in cost and high in speed.

It is a further object of this invention to provide an associative memory which uses a plurality of such binary storage elements. Such a memory being considerably superior in performance and cost than associative memories using previously available storage elements.

It is a further object of this invention to provide a new form of non-destructive read-out of a memory element of the magnetic thin film type.

It is a still further object to provide an associative memory whose output signals are reliable indications of match or mismatch conditions. A feature of this invention which makes for this reliability is the unidirectional signal obtained for a mismatch condition and the non-necessity for balancing outputs of paired memory elements.

It is another feature of this invention that only one memory element is necessary for each bit of stored information instead of the two memory elements which are required in previous associative memories although two elements may be used in a preferred embodiment of this invention if desired.

It is another feature of this invention that the sensing of the outputs of the associative memory may be at a time different from the time of interrogation excitation so that the output is free of noise produced by the excitation.

The associative memory of this invention provides these objects and features by employing the magnetoresistive property of thin magnetic film memory strips properly energized by interrogating magnetic fields. Each thin film memory strip uses a plurality of easy axis fields and a transverse time coincident magnetic field for the writing-in of information at a plurality of regions along the length of the strip corresponding to the bits of a word. Read out is accomplished by applying an easy axis field to every bit in a word and to all words in the memory simultaneously. The direction of the fields applied to the word bits corresponds to the binary representation of the word whose presence in the associative memory is to be determined. The resistance change of the thin film strip in each word is detected when the fields are applied to the bits of each word. Minimum change in resistance of a bit occurs when the field applied to that bit is in the same direction as that of the field stored in that bit. Therefore, where the stored bits of a word correspond to the bits of the word applied to the memory, the resistance of that "matched" word is essentially unchanged; whereas, for each other word a "mismatch" of only one bit will cause a substantial change in resistance of that "mismatched" word. The thin film memory strip contains the bits of a word in serial connection so that the resistance change of all the bits of a word is conveniently obtained by measuring the resistance change of each strip. The "mismatch" condition in any bit of a word will cause the resistance to decrease irrespective of whether a "one" or a "zero" is stored in the mismatched bit. This unidirectional change in resistance is converted to a unidirectional voltage output change by causing current to flow through the thin film strip. Hence, the associative memory of this invention also possesses the desired characteristic of providing a mismatch output signal polarity which is independent of the stored information in the mismatched bit. The memory also uses only one thin film element per bit. The mismatch-to-match resistance change produced by applying the easy axis direction interrogate field is also substantial thereby allowing the words stored in the memory to contain a large number of bits. The magnitude of the interrogate field is kept below the level which will cause irreversible switching of the field in an element thereby also providing the necessary characteristic of an associative memory of having a non-destructive read-out.

Other objects and features of the present invention will be apparent from the following description taken in conjunction with the figures, in which, FIGURE 1 shows a single thin film memory element arranged to provide a non-destructive magnetoresistive read-out.

Figure 1:
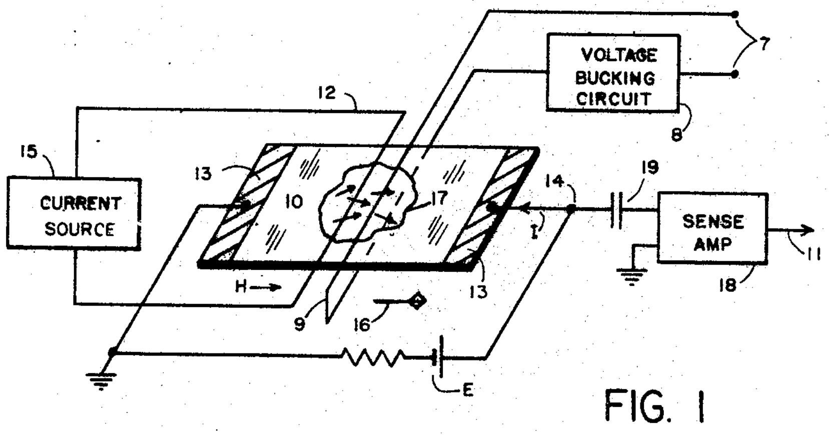

Before referring to a detailed description of the invention it is desirable to consider the magnetoresistive effect in thin films. An interior single domain region of a uniaxial thin film, a region remote from walls, when subjected to any easy axis reversing field undergoes "birotation," i.e., the local magnetization rotates incoherently toward whichever hard direction the local dispersion This tranverse rotation occurs regardless of the sense of the original domain as long as the applied field is applied opposite to the stored magnetization direction. If the field is applied in the same direction as the magnetization, negligible rotation occurs because the film is simply saturated from the slightly dispersed state. When the field is removed, the field returns to its original slightly dispersed state. The birotation effect becomes significant when the reversing field H is greater than the wall coercive force $H_c$ but of necessity the reversing field H must be less than the field for wall nucleation $H_N$.

The change in resistance of a thin film magnetic element having magnetoresistive properties, which change in resistance occurs when the internal field of the thin film magnetic element is rotated, is used to sense whether the film element has a stored internal field in the same (match) or opposite (mismatch) direction as an external applied field. For magnetic materials the resistivity is a function of the angle between magnetization direction of the field in the material and the direction of current flow through the material. The resistivity being lowest when they are perpendicular and highest when they are parallel. For 81% iron-19% nickel bulk permalloy at room temperature the maximum magnetoresistive change is approximately 4½%.

The resistivity of films is somewhat higher than in the bulk material and the magnetoresistive effect is somewhat less, values ranging downward from 3.8% which is common for a film approximately 1000 A. thick. Since the mean free path of the conduction electrons is of the order of 200 A., at one mean free path for film thickness the resistivity has increased by about half the bulk value and for thinner films it increases rapidly, thus setting a lower useful film thickness for employing the magnetoresistive effect for read-out.

When the maximum easy axis force that can be applied to produce birotation without causing a permanent change in the direction of stored field is applied, the magnetoresistance change is only a small fraction of the above figure, namely about 5–10%. Thus the birotation magnetoresistive effects of this invention provide only about 0.2% change in resistance of an element. However, this change is sufficient to produce a useful associative memory array.

Before considering the associative memory embodiment of this invention, a single thin film memory element constituting one bit of the associative memory will be described in the context of its mode of operation in the memory. The single thin film memory element 10 of FIG. 1 has a preferred axis or direction of magnetization 16. It is assumed that element 10 has been previously magnetized so that it has a stored magnetic field in the direction of the arrow of axis 16. The element 10 is typically a Permalloy film of 81% iron, 19% nickel, 1000 A. thick having magnetoresistive properties. The resistance of the element 10 may be conveniently determined by measuring the voltage across the element 10 at terminal 14. For this purpose, a current I from source E is caused to flow through element 10 in the direction of its easy axis. Electrical contacts 13 are provided for this purpose. The electrical contacts 13 are placed in contact with film element 10 by the well-known technique of initiation by vapor deposition of copper followed by buildup by chemical deposition of copper to the desired thickness.

The magnitude of the resistance of element 10 measured between contacts 13 may be changed by application of a magnetomotive force H along the easy axis 16. The force H may be obtained from energizing an electrical conductor 12 from an electrical energy source such as current source 15. The conductor 12 is in insulated closely spaced relation to the element 10 and preferably remotely or centrally positioned relative the edge contacts 13. The element 10 has a remanent magnetic field in the direction of the arrow of easy axis 16. If an interior region 17 of film element 10 is considered it will be seen that within region 17 the local magnetization directions are disposed slightly from the easy axis direction 16. If the current from source 15 is such that the resultant MMF H from conductor 12 on film 10 is in the same direction as the remanent magnetization, the dispersion within region 17 will decrease with a consequent increase in the resistance of the element 10 between contacts 13; alternately, the resistance decreases with increased dispersion which occurs when the applied MMF is opposite to the direction of the remanent flux. The direction of change in resistance therefore determines whether there has been a match or mismatch in the directions of the remanent flux and the applied MMF.

The change in resistance may be detected by a sense amplifier 18 connected to terminal 14. Since only the change in resistance need be measured the amplifier 18 may be coupled to terminal 14 through a capacitor 19. The amplifier 18 may be a direct current amplifier and may be directly connected to terminal 14 if desired. Since the change in resistance persists for as long as the MMF is applied, the output signal on terminal 11 may be observed at any time during the application of the MMF. Preferably the signal is observed after the noise transients which may be generated by initiation of the MMF by current from source 15 in wire 12 have subsided. The capacitor 19 is large enough to couple the change in voltage at terminal 14 of amplifier 18 for longer than the time required for the transient to subside.

The applied magnetomotive force H is desirably as large as may be applied repetitively without changing the state of magnetization of element 10. Keeping the magnetomotive force H away from the edges of element 10 at contacts 13 is desirable since magnetic domain walls exist at these edges and the stored magnetization will switch more readily at a wall. For this reason the interrogate conductor 12 is centrally located between contacts 13. The maximum magnetomotive force H which may be applied must be less than the nucleation force $H_N$ which force will cause the film magnetization to switch in the absence of domain walls.

It has been found that a resistance change approximately 5–10% of that obtainable with full transverse rotation is obtained when birotation is used. For example, an element 10 which is 10 mils wide by 100 mils long, 1000 A. thick (resistance about 50 ohms) carrying a current I of 10 ma. DC will provide a one millivolt change in output voltage at terminal 14 when the maximum allowable magnetomotive force H is applied in a direction opposite to the stored magnetic field in the element 10. The limitation on the output voltage also arises from the limitation on the current I that flows through the film to stay within the allowable power dissipation in the film. Cooling and heat sinking techniques may be used to increase the signal output by increasing the allowable power dissipation.

In addition to the magnetoresistive change of thin film element 10 which occurs with application of the interrogating easy axis field H, there is also a change in the amount of easy axis flux in element 10. The increase or decrease of dispersion of magnetic field in the element, depending on the direction of field H relative the stored flux in the element, causes a change in easy axis field magnitude. This change in easy axis flux may be sensed by coil 9 which encircles film 10 to form a loop transverse to the easy axis 16. Since coil 9 will be parallel and in proximity to the interrogating wire or coil 12 it will pick up flux directly from wire 12. The voltage induced in coil 9 by this direct flux linkage to wire 12 is cancelled by voltage bucking circuit 8. The buckling provides a voltage at output terminals 7 which is primarily a result of the change in magnitude of easy axis flux in element 10 produced by the interrogate current in wire 12.

Figure 2:
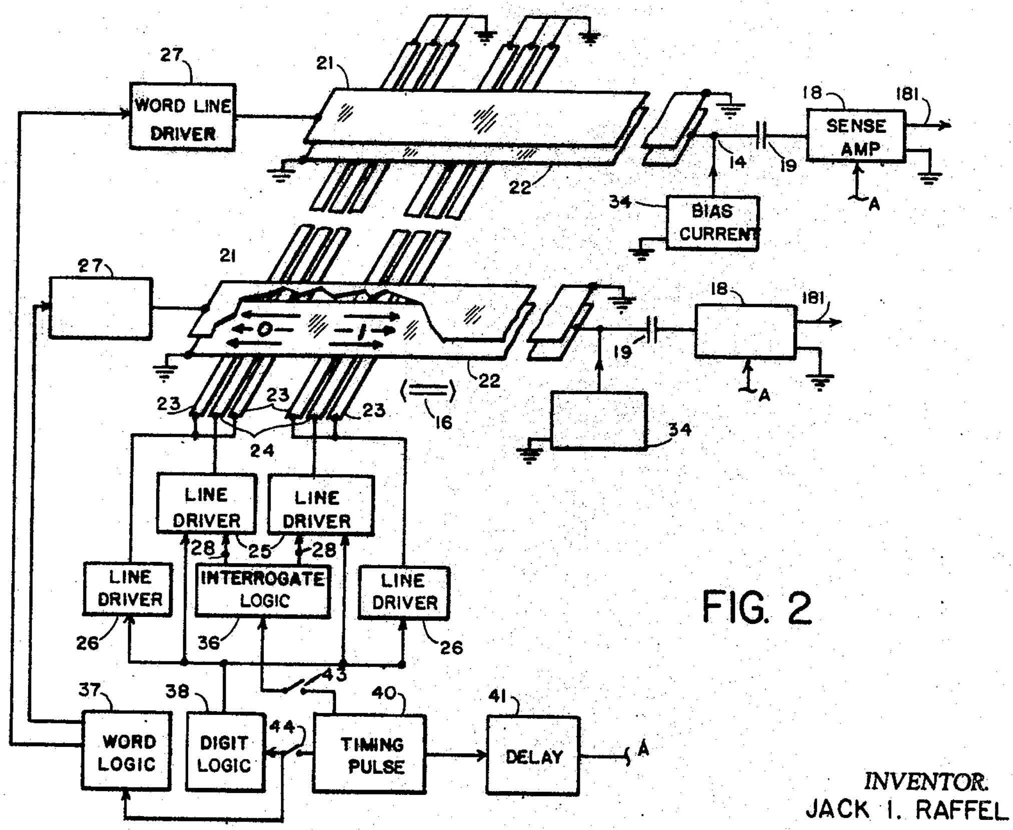
FIGURE 2 shows an associative memory array using thin film memory strips and magnetoresistive read-out.

FIG. 2 shows an associative memory array wherein the bits of a word are provided in localized regions of a continuous strip 22 of a thin magnetic film. These localized regions occur at the intersection of the word excitation lines 21 and the orthogonal digit excitation lines 23, 24. The lines 21, 23 and 24 are electrically conductive lines which when energized provide a magnetic field which acts upon the magnetic film in the vicinity of the energized conductor. The digit lines 23, 24 are split into three parallel conductors. All three conductors are simultaneously energized with the same direction of current from sources 25, 26 to provide a digit field in the easy axis 16 direction when writing is performed, whereas only the center conductor 24 is energized when the content of the bits of the array are being sensed. As explained elsewhere the reason for this is to keep the interrogate field removed from the domain boundaries of the regions constituting the bits of the words. The direction of current in each set of digit lines 23, 24 is determined by the digit logic circuit 38 to correspond to the digit of the word to be stored.

Writing is accomplished using the standard method of time coincidence of transverse and digit fields from lines 21, 23, 24, the transverse field being obtained by current in word line 21 from a source 27 selected by word selection circuit 37. The result of the coincidence of the transverse field and the digit fields is to magnetize the region at their intersections either to the right for a ONE or to the left for a ZERO. Each intersection forms a memory element which will store a bit of information in a localized region of word line or strip 22. This form of writing is described in detail in applicant's co-pending application Ser. No. 23,269 assigned to the same assignee.

To interrogate the memory, all bits of the array are energized simultaneously by energizing only the center conductors 24 from current sources 25. If searching for a ZERO at a particular bit position of a word, the corresponding conductor 24 is energized to provide a field to the left, if searching for a ONE, the field is to the right. For a match condition, i.e. the stored magnetization and applied field in the same direction at a particular bit position, there will be essentially no change in the magnetization at the interrogated bit position. For a mismatch, the magnetization will rotate noncoherently to the multidomain pattern which occurs just below nucleation. Only the center conductor 24 is energized by digit current when searching in order to avoid the domain wall boundaries at the edges of the magnetized region so that a larger than the wall coercive force $H_c$ easy axis field may be applied, thereby producing greater noncoherent rotation than could otherwise be obtainable.

If the "ones" and "zeros" in the digits of a word line magnetic strip 22 match the ones and zeros of the interrogate digit lines 24 as energized by current sources 25, a word "match" condition exists and there will be ideally no change in the resistance of the magnetic strip 22 and hence no voltage change at terminal 14 to be sensed by capacitor 19 coupled sense amplifier 18. The voltage at terminal 14 is provided by bias current 39 in strip 22 from current source 34. The direction of current provided in lines 24 by sources 25 is controlled by the digits of the word applied to terminals 28 as provided by interrogate logic circuit 36. For all the other word line magnetic strips 22, where there is mismatch in at least one bit position, the resistance of the word line magnetic strip will be changed substantially so that an output voltage will appear in those sense amplifier 18 outputs 181 to indicate a mismatch condition.

Although ideally no resistance change occurs under a match condition at any digit, in practice the decreased dispersion of the magnetization in the region of influence of the energized interrogate line 24 results in an increase in the resistance of the thin-film element at that digit position. The magnitude of this increase in resistance under a match condition must be substantially smaller than the decrease in resistance under a mismatch condition. The reason for this is that it is desired to be able to detect a mismatch in any one digit of a word where the word has a large number of digits which are matched. The sum of the resistance increase caused by the matched digits must be less than the resistance decrease of one mismatched digit by an amount at least equal to a threshold value which is established with consideration for noise in the system.

A mismatch-to-match resistance-change ratio of fifteen to one is readily attainable in thin films which means that in practice a word length of fifteen bits is permissible for a reasonable threshold value and taking into consideration the resistance change variations which exist from one thin film bit or strip to another. In the interests of higher reliability, a higher threshold would be established which would mean that a word length of less than fifteen bits would be interrogated at any time. The sense amplifier 18 is easily adapted by standard techniques to be unresponsive to inputs less than a threshold value; in other words, signal level discrimination is used. A suitable technique is to bias a transistor to an "off" condition by the threshold value. Since the mismatch signal to be detected is unidirectional in polarity, threshold detection is easily accomplished.

Figure 3:
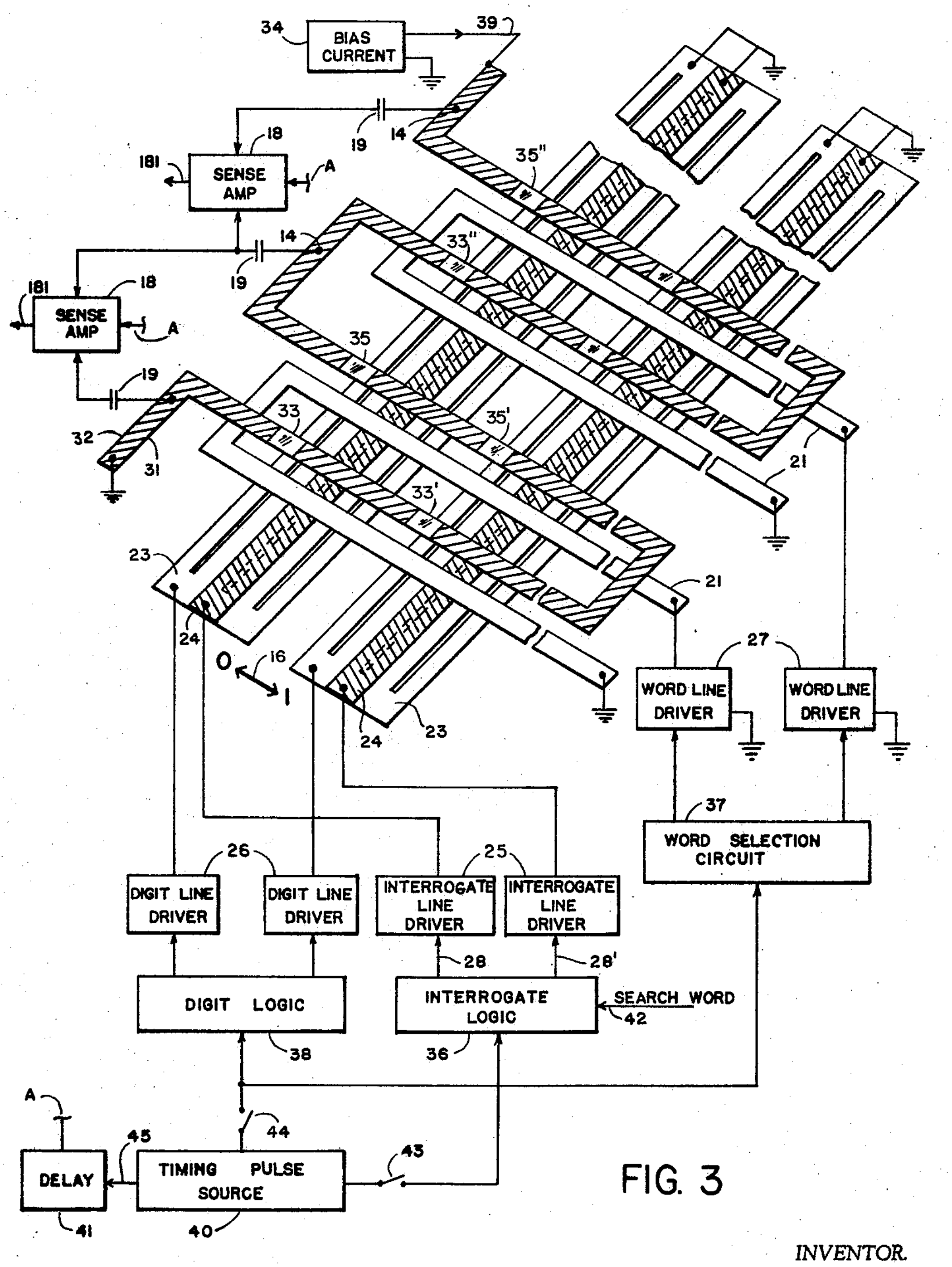
FIGURE 3 shows a preferred embodiment of the associative memory array wherein noise-cancellation is also provided.

An improved associative memory array is shown in FIG. 3. This array differs substantially in structure from that of FIG. 2 in order to obtain improved operating characteristics but employs the same magnetoresistive effect for detection of a word match. Magnetic film lines 31 having an easy or preferred axis of magnetization 16 are evaporated on a suitable substrate, not shown in FIG. 3, by the usual deposition techniques. A layer or coating of copper 32 is evaporated on the film lines 31. Windows or gaps 33 are left in the copper layer 32 at those areas of the film which are to be interrogated by sensing their resistance change under the influence of the digit line 24 interrogating fields. The copper layer 32 is effective in reducing the power dissipation in the magnetic film caused by the bias current 39 in the film provided by bias source 34. Layer 32 also reduces the impedance of the line which increases the voltage available at output terminals 14 from the voltage generated at the interrogated word bits at gaps 33.

The portion of the film line 31 on which the digits of a word are stored is "hairpin" shaped terminating at adjacent output terminals 14. This arrangement is desirable because it allows the capacitively coupled noise voltage induced in film line 31 when interrogate line 24 is energized to be balanced-out. The balanced sense amplifier 18 arrangement of the hairpin film memory lines 31 also allows the lines to be connected in series for connection to a common source of bias current 34. This shape also provides a low impedance return circuit to the sense amplifier 18.

It should be noted that the information stored at the bit location at window 33 is the same as that at window location 35 and that their individual magnetoresistive effects are in series addition. The word 21, digit 23 and interrogate 24 drive lines may be copper coated plastic sheets etched in the usual fashion. The word lines 21 which provide the transverse field for each word written into the memory is also a "hairpin" shaped line parallel to and directly adjacent to the film line 31. Under the word line 21 substrate, not shown, and perpendicular to the word lines 21 are the interrogate lines 24. The interrogate lines 24 are in registration with and somewhat narrower than the windows 33. Each interrogate line 24 is connected to its corresponding interrogate current source 25 whose output is controlled by the interrogate logic circuit 36 in which the word whose presence in the memory is desired to be is contained. The digit lines 23 are in registration with and wider than the interrogate lines 24. A width ratio of approximately three to one is satisfactory in the sense of having the interrogate field sufficiently far removed from the domain boundary walls of the storate element which exists in the region occupied at the intersection of the digit 23 and write lines 21 This configuration of the digit 23 and interrogate 24 lines increases the interrogate time because of the eddy currents induced in digit line 23 when the interrogate line 24 is pulsed. These eddy currents cause the field produced by the interrogate line 24 to be confined between lines 23 and 24. Of course, the eddy currents vanish with time after the application of a current pulse to line 24 and the field is then exerted on film 31. The interrogate time is reduced considerably if the digit line 23 consists of a plurality of spaced lines as shown in FIG. 3, at least in the vicinity of its crossing of film 31.

Writing is accomplished in the normal manner of time coincident energization of a selected word line driver 27 by word selection circuit 37 and the digit lines 23 by digit current sources 26 which are in turn controlled by digit logic circuit 38. Writing leaves the bits of the selected word in the regions of windows 33 magnetized in opposite easy axis 16 directions for a "one" and a "zero" with all closure domain walls well outside the window area 33. The film 31 in all word lines is interrogated by energizing the interrogate lines 24 with the desired current polarities as determined by interrogate logic circuit 36 containing the word being selected; those bits whose magnetization direction matches the direction of the interrogate field will remain essentially unchanged, those which mismatch will decrease in resistance as the magnetization incoherently rotates tot he multidomain pattern just below the nucleation threshold. Each signal amplifier 18 sees the voltage change generated by the total resistance change in its associated "hairpin" film word line. Only that signal amplifier 18 connected to a line whose stored information exactly matches the interrogating word will receive essentially no signal.

As discussed earlier, since the change in resistance of the magnetic strip 22 continues for as long as the interrogate field from the energized line 24 is applied, the resistance change can be sensed subsequent to initiation of the interrogate field and after the transient noise disturbances generated by the initiation has diminished to an acceptable level. This is a considerable advantage over most magnetic devices where the signal is produced by the instantaneous change in the flux stored which is also the time at which the noise is generated by the excitation which causes the desired change in stored flux. Reference to FIGS. 2 and 3 reveals a timing pulse source 40 which provides synchronizing pulses at its output for the coincident excitation of digit logic 38 and word selection 37 circuits for writing in information to a selected word. Timing pulse source 40 also causes the interrogate logic circuit 36 to search for a particular word 42 which may be stored in the associative memory. The search mode is activated by closure of switch 43, and the disabling of the write mode by the opening of switches 44. The sense amplifier 18 may be gated on by a pulse at the output of delay circuit 41 whose input may be the same pulse 45 which causes the interrogation to occur. The amount of delay in delay circuit 41 is adjusted to produce a satisfactory signal with minimum delay since delay causes the circuit operation to be slowed in proportion thereto.

The memory configuration of FIG. 3 has been described as using "hairpin" shaped thin film magnetic lines 31. This shape allows a balance input sense amplifier 18 to have its inputs connected at each end of the hairpin portion of line 31 forming a word. In FIG. 3 a capacitive 19 connection is used to isolate the amplifier 18 from the DC level at which the line 31 sits. Since a balanced input is used, the noise pulse generated in the line 31 when the interrogate lines 24 are pulsed will occur with the same polarity and magnitude at both inputs to the sense amplifier 18 and hence be balanced out. This balancing prevents overloading of the amplifier 18 which because of the need for a recovery time would slow down the operation of the memory.

In addition the use of the "hairpin" shaped magnetic film lines 31 together with the use of the balanced input sense amplifier 18 allows the film lines 31 of each word to be serially connected and energized by a common bias current source 34. This is so because resistance changes which occur in other word film lines 31 other than that to which both inputs of the sense amplifier 18 are connected provide equal voltage changes at both inputs to the amplifier 18 and hence are balanced out and are not amplified. However, resistance changes in a particular hairpin are amplified by the sense amplifier 18 connected across that hairpin.

The film signal is directly proportional to the bias current 39 which flows through thin film lines 31; naturally the largest possible signal is desired. The bias current is in turn limited by the relative cost of putting in and removing the DC power, and the ability of the film substrate itself to dissipate heat. The heat transfer from the film must mainly take place through the substrate on which the film is deposited since the plastic films forming the drive line mats offer high thermal resistance. Substantially more heat can be dissipated by using high conductivity substrates such as alumina, or glazed alumina or beryllia. Alumina is preferred because it can be processed interchangeably with glass and in inexpensive. The use of alumina substrates permits signal levels of the order of 5–10 mv. thereby easing the amplifier problem and increasing the power dissipation to a few watts per word.

A high mismatch-to-match ratio is desired of the thin film elements. Many films show ratios of only 7:1 when driven to the wall motion threshold $H_c$. High mismatch outputs require films which can be driven far beyond $H_c$ without switching, which in turn means that those films must be totally without walls in their interrogated regions, or the walls which exist around imperfections must be highly locked. Experience has shown that small pinholes do not usually affect the birotational switching threshold. "Bitter" patterns show stable edge domains which are moved but not wiped out by even large transverse fields, although longitudinal fields a few times the coercivity are completely effective. This problem can be solved in thicker films by tapering the edges—as by evaporation through masks spaced from the substrate—or by using films of the order of 250 angstroms or thinner.

Although the magnetoresistive effect has been described in detail by reference to FIG. 1 where the bias current is along the easy axis 16, a magnetoresistive effect will also occur where the bias current is caused to flow along the transverse or hard magnetization direction of the film 10. Again the applied magnetomotive force H is along the easy axis 16 direction, but the electrical contacts 13 would be spaced from each other along the hard axis.

While there have been shown and described the fundamental novel features of the invention as applied to preferred embodiments, it will be understood that various omissions, substitutions, and changes in the forms and details of the devices illustrated and its operation may be made by those skilled in the art without departing from the spirit of the invention.

What is claimed is:

1. A binary information storage element comprising,
a magnetic material having a preferred axis of magnetization, said material having a stored magnetic field along said axis,
means for applying a magnetomotive force along said preferred axis only,
said magnetomotive force being less than the value of force required to switch the direction of magnetization,
means for sensing the effect of the change in the magnitude of the stored field along the preferred axis produced by said applied field,
said effect having a polarity dependent upon the relative directions of said stored field and said applied field,
whereby the relative direction of said stored and applied field may be determined.

2. A binary information storage element comprising,
a magnetic material having a preferred direction of magnetization, said material having magnetoresistive properties,
means for applying a magnetic field to said material along said preferred direction,
said field being smaller than the value which will cause switching of any stored field in said material,
means for determining the change in resistance of said material in response to said applied field.

3. A binary information storage element comprising,
a magnetoresistive thin magnetic film having an easy axis of magnetization,
means for applying a magnetic field to said element in the direction of said axis, said magnetic field being smaller in amplitude than the field required to irreversibly switch the direction of flux in said film,
means for determining the change in resistance of said film along said easy axis direction in response to said applied field.

4. A binary information storage element comprising,
a magnetoresistive thin film having a preferred axis of magnetization,
means for causing said film to have a remanent field in a direction along said axis,
means for applying a magnetic field along said preferred axis, said magnetic field being of smaller magnitude than the field required to irreversibly change the direction of remanent magnetization,
means for determining the change in resistance of said film produced by said applied field, said resistance being measured along the easy axis dimension of said film,
said change in resistance having a magnitude and direction dependent upon the direction of said applied field relative the direction of said remanent field.

5. The storage element of claim 4 wherein,
said magnetic field has an amplitude greater than the wall domain coercive force $H_c$ and less than wall nucleation force $H_N$, said field being applied to said film in a region removed from the boundary edges of the remanent field in said film.

6. The storage element of claim 4 wherein,
said resistance determining means comprises,
means for causing a current to flow through said film in the easy axis direction,
means for measuring the voltage across said film in the easy axis direction,
whereby said change in voltage corresponds to the change in resistance of said film.

7. An associative memory comprising,
a plurality of magnetic thin film strips, each strip having a preferred axis of magnetization in the direction of said strip, said film strips being magnetoresistive,
a plurality of word lines, one for each film strip and in registration with said film strip,
a plurality of digit lines substantially orthogonal to said word lines, the regions where said digit lines cross over said word lines defining binary information storage regions in said strips,
each magnetic strip having a plurality of such storage regions,
means for selectively energizing said digit lines and said word lines to store the binary bits of a different word in each different magnetic strip, each bit being stored in a different one of said plurality of storage regions in each strip,
a plurality of interrogate lines,
each interrogate line being in registration with a different digit of a magnetic strip,
means for energizing each digit interrogate line with a current whose direction corresponds to the binary information of the corresponding digit of a search word,
means for determining the resistance change of each magnetic strip during said interrogate line energization,
the resistance change of each strip being a function of the number of bits of said strip having stored information in the same direction as the interrogating field,
the resistance change of one strip having all its bit storage field directions matched in direction with the interrogating field being different from all other strip resistance changes,
whereby the presence of a match condition is determined together with the identity of the search word.

8. The associative memory as in claim 7 wherein,
each binary information storage region in said magnetic strips is defined by at least the area of the crossover of one of said word lines and a group of at least three of said plurality of digit lines, said grouped digit lines being closely spaced from each other,
each interrogate line being an interior line of said group of digit lines.

9. The associative memory of claim 7 wherein,
said resistance change determining means comprises,
means for providing a current to flow through each magnetic strip, and
means for detecting the voltage change in each strip.

10. The associative memory of claim 7 wherein,
said magnetic strip is at least partially covered with a good electrical conductor except in the immediate vicinity of the region of registration of the interrogate lines and the magnetic strip storage regions.

11. The associate memory of claim 7 wherein,
each digit line is in registration with and electrically insulated from its associated interrogate line,
said digit line being substantially wider than said interrogate line.

12. The associative memory of claim 7 wherein,
each digit line is in registration with and in closely-spaced electrically-insulated relation to its associated interrogate line,
said digit line being substantially wider than said interrogate line,
said interrogate line being centrally disposed relative the width of said digit line,
said digit line comprising a plurality of parallel spaced conductors at least in the region where said digit line crosses said word line.

13. The assocative memory of claim 7 wherein said means for determining said resistance change comprises,
means for delaying said determination until the noise induced in said magnetic strip by the initiation of interrogate line energization has subsided.

14. The associative memory of claim 7 wherein,
said means for determining resistance changes comprises,
a current source for providing current through each magnetic strip in the preferred axis direction,
an amplifier for detecting the voltage change in each strip when said interrogate lines are energized,
a pulse current source,
said interrogate lines being energized by a pulsed current from said source,
said amplifier being gated-on after the initiation of said pulsed current by said source,
whereby the noise produced in said magnetic strip by the initiation of said pulsed current is reduced before said amplifier is gated-on.

15. An associative memory comprising,
a plurality of magnetic thin film strips, each strip having a hairpin shape and a preferred axis of magnetization in the direction of the parallel portions of said strip, said strip being magnetoresistive,
a plurality of word lines, each word line having a hairpin shape and in registration with a hairpin shaped magnetic strip at least in said parallel portions,
a plurality of digit lines substantially orthogonal to said word lines, the regions where said digit lines cross over said word lines defining binary information storage regions in said strips,
each magnetic strip having a plurality of such storage regions,
means for selectively energizing said digit lines and said word lines to magnetically store the binary bits of a different word in the storage regions of each different magnetic strip,
each two of said plurality of storage regions of a strip common to a digit line containing the same binary bit information of the word stored on said strip,
a plurality of interrogate lines,
each interrogate line being in registration with the two bit storage regions of each strip which define a digit of the word stored on the strip,
means for energizing each digit interrogate line with a current whose direction is related to the corresponding binary digit of a word whose presence in storage in the associative memory is to be determined,
means for determining the resistance change of each hairpin shaped magnetic strip during said interrogate line energization,
the resistance change of each strip being a function of the number of digit regions of said strip having stored fields in the same direction as the corresponding digit interrogate fields,
the resistance change of one strip having all its digit region fields matched in direction with the interrogating fields being different from all other strip resistance changes,
said resistance change determining means having a balanced input, each input of the balanced input being connected to a different adjacent end of said hairpin shaped magnetic strip.

16. The associative memory as in claim 15 wherein said means for determining resistance change comprises,
means for providing a current through each hairpin shaped magnetic strip,
a plurality of voltage amplifiers, one for each magnetic strip,
each amplifier having a balanced input, each input terminal of said balanced input being connected to a different adjacent end of said strip,
whereby the noise voltage induced in said strip at the initiation of said interrogate current appears with equal magnitude and the same polarity at both input terminals of said amplifier.

17. The associative memory as in claim 16 wherein said plurality of magnetic film strips are serially connected to each other,
whereby said means for providing a current through each strip comprises a current source connected to said serial strips.

References Cited

UNITED STATES PATENTS

| | | | |
|---|---|---|---|
| 3,209,333 | 9/1965 | Russell | 340—174 |
| 3,218,616 | 11/1965 | Huijer et al. | 340—174 |
| 3,223,985 | 12/1965 | Bittmann et al. | 340—174 |
| 3,366,939 | 1/1968 | Chanteloup | 340—174 |

OTHER REFERENCES

Huijer, P.: Magnetoresistive Readout of Thin-Film Memories, International Solid-State Circuits Conference, pp. 36–37, Feb. 14, 1962.

BERNARD KONICK, Primary Examiner

GARY M. HOFFMAN, Assistant Examiner